(12) United States Patent
Morris

(10) Patent No.: US 11,308,085 B2
(45) Date of Patent: Apr. 19, 2022

(54) MAP INTELLIGENCE FOR MAPPING DATA TO MULTIPLE PROCESSING UNITS OF DATABASE SYSTEMS

(71) Applicant: Teradata US, Inc., Dayton, OH (US)

(72) Inventor: John Mark Morris, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 800 days.

(21) Appl. No.: 14/696,711

(22) Filed: Apr. 27, 2015

(65) Prior Publication Data
US 2016/0162547 A1   Jun. 9, 2016

Related U.S. Application Data

(60) Provisional application No. 62/088,862, filed on Dec. 8, 2014.

(51) Int. Cl.
*G06F 16/245* (2019.01)
*G06F 16/2453* (2019.01)

(52) U.S. Cl.
CPC .. *G06F 16/24542* (2019.01); *G06F 16/24532* (2019.01)

(58) Field of Classification Search
CPC ......... G06F 17/30463; G06F 17/30445; G06F 17/30982; G06F 9/28; G06F 16/24542; G06F 16/24532

USPC .................................................. 707/718, 764
See application file for complete search history.

(56) References Cited

U.S. PATENT DOCUMENTS

| | | | |
|---|---|---|---|
| 8,543,596 B1* | 9/2013 | Kostamaa | G06F 16/182 707/770 |
| 2008/0059408 A1* | 3/2008 | Barsness | G06F 17/30545 |
| 2009/0043726 A1* | 2/2009 | Watzke | G06F 17/30592 |
| 2010/0049722 A1* | 2/2010 | Xu | G06F 17/30445 707/764 |
| 2011/0099325 A1* | 4/2011 | Roh | G06F 3/0619 711/103 |
| 2014/0244578 A1* | 8/2014 | Winkelstraeter | G06F 11/1435 707/617 |

* cited by examiner

*Primary Examiner* — Hares Jami
(74) *Attorney, Agent, or Firm* — Ramin Mahboubian

(57) ABSTRACT

One or more assignments (e.g., one or more maps) can be used for assigning data to processing units of a database system with multiple processing. In other words, assignments can be provided as a more effective solution for assigning data to the processing units of database systems that can operate with multiple processing units. Generally, an assignment can be used to assign data to the processing units for processing, virtually in any desired manner (e.g., virtually any desired function). By way of example, maps can associate data to containers (e.g., buckets) and associate the containers to processing units of database system with multiple processing units.

24 Claims, 11 Drawing Sheets

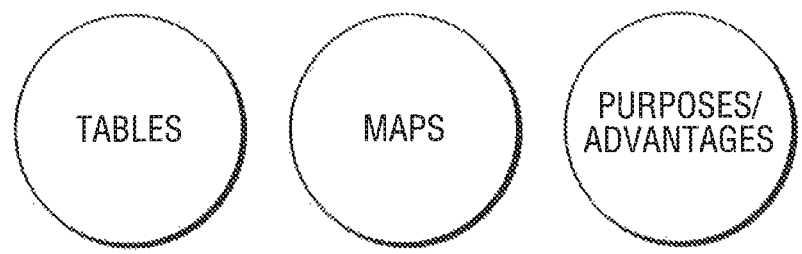
FIG. 3
FIG. 4
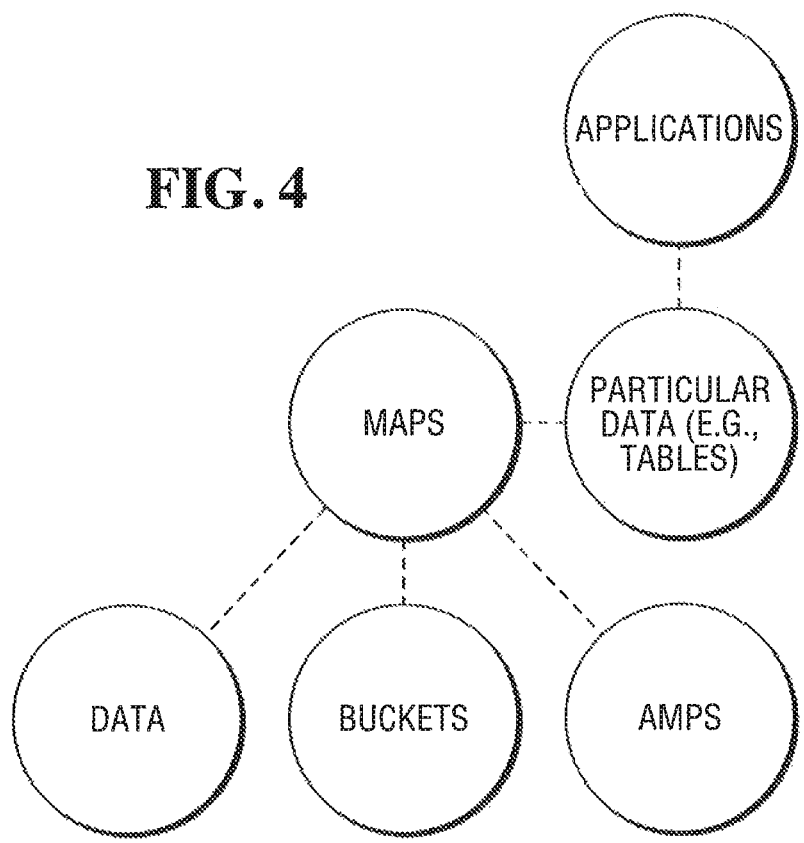

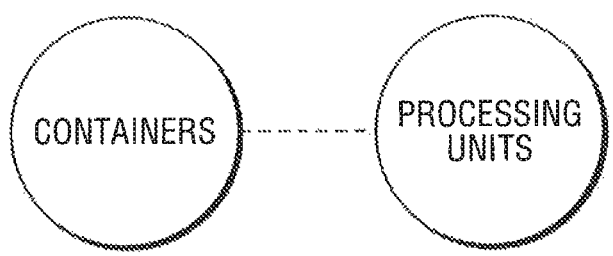
FIG. 9
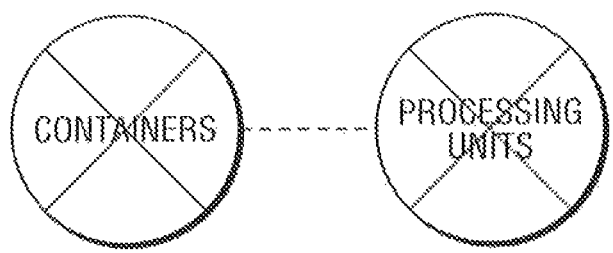
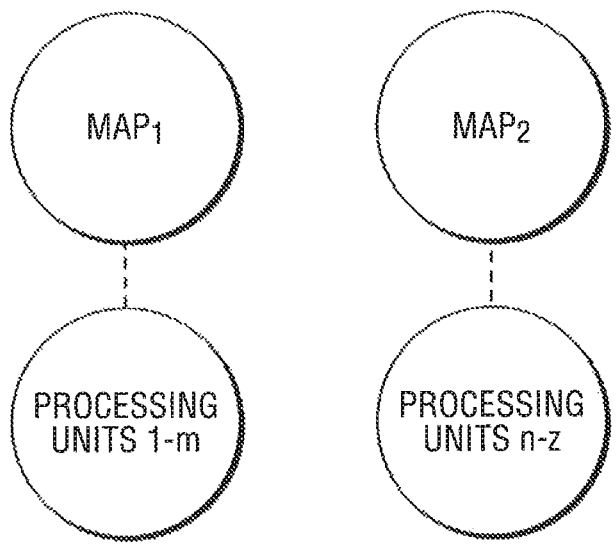
FIG. 10

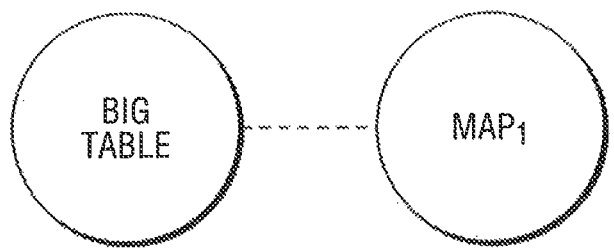
FIG. 11
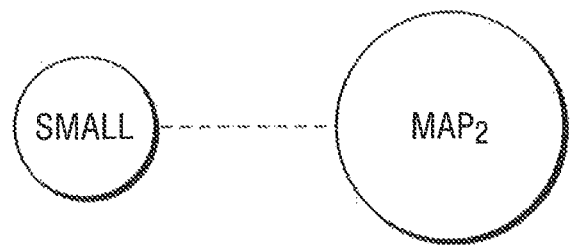
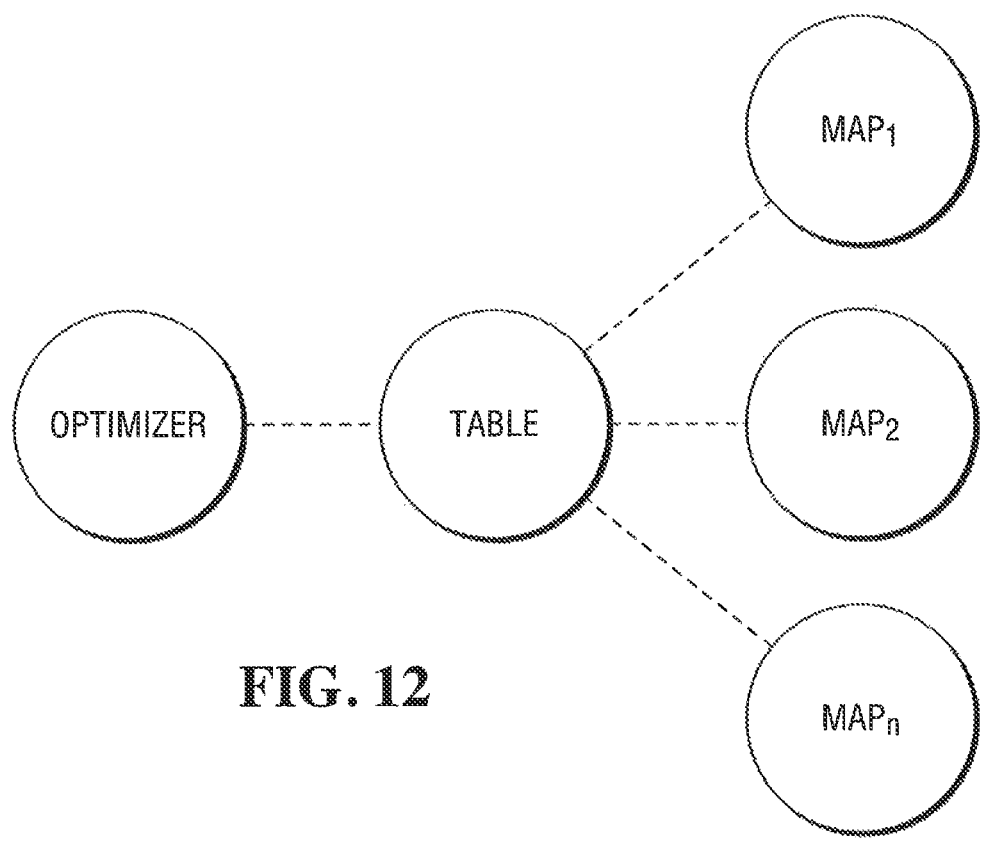
FIG. 12

MAP INTELLIGENCE FOR MAPPING DATA TO MULTIPLE PROCESSING UNITS OF DATABASE SYSTEMS

CROSS REFERENCE TO THE RELATED APPLICATIONS

This application take priority form the Provisional U.S. Patent Application No. 62/088,862, entitled: "MAP INTELLIGENCE FOR MAPPING DATA TO MULTIPLE PROCESSING UNITS OF DATABASE SYSTEMS," by John Mark Morris, filed on Dec. 8, 2014, which is hereby incorporated by references herein for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users," Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Today, database systems with multiple processing nodes can be very effective for storing and processing data. For example, in a multi-node database system, each node can be provided with one or more processing units. A processing unit in a node can be provided with one or more physical processors that each support one or more virtual processors.

Each node of a multi-node database system can, for example, have its own storage for storing data of the database. Generally, data stored in a database can be assigned for storage and/or processing to a processing unit or to a node of the database system. Ideally, data should be distributed between the nodes and/or processing units in an effective manner and database queries should be processed in a manner that would allow effective use of all of the nodes and/or processing units of the multi-node database system to extend possible or needed.

In view of the prevalence of databases, especially, those with multiple processing units, in various aspects of commerce and general life today, it is apparent that database systems with multiple processing units are very useful.

SUMMARY

Broadly speaking, the invention relates to computing environments and systems. More particularly, the invention relates to database systems.

In accordance with one aspect, data can be assigned to processing units of a database system with multiple processing. The assignment of data to the processing units can be referred to herein as mapping data. As such, a data map (or a map) can be used for assigning data to processing units of a database system with multiple processing in accordance with one embodiment. In other words, maps (or other suitable mechanism or effectively assigning data) can be provided as a more effective solution for assigning data to the processing units of database systems that can operate with multiple processing units. Generally, a map can be used to assign data to the processing units for processing, virtually in any desired manner (e.g., virtually any desired function). By way of example, maps can associate data to containers (e.g., buckets) and associate the containers to processing units of database system with multiple processing units in accordance with one embodiment.

In accordance with another aspect, multiple assignments (e.g., multiple maps) can be provided for assignment of the same data. In accordance with yet another aspect, multiple assignment (e.g., multiple maps) can have various states (e.g., active, inactive). It will also be appreciated that the (data assignments) (e.g., maps can be used to provide additional benefits, including, for example, fault resiliency, query optimization, elasticity. Also, it will be appreciated that data assignments (e.g., maps) can better facilitate implementation of desired application and/or environments, including, for example, software only and Cloud, Commodity, and Open Environments, as well as, Open, Purpose-Built, or Multi-Platforms.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 depicts one or more maps provided for one or more tables in accordance with one embodiment FIG. 4 depicts maps that effectively assign data of a database, including tables, to buckets and AMPS for various applications in accordance with one embodiment.

FIG. 9 depicts processing units (e.g., parallel processing units) that can be online or offline at a given time in accordance with one embodiment.

FIG. 10 depicts disjoint maps associated with different pools of processing units (e.g., Parallel AMP units in a multi-node database system) in accordance with one embodiment.

FIG. 11 depicts storage of tables in disjoint maps in accordance with one embodiment.

FIG. 12 depicts a map-aware optimizer configured to use multiple maps ($Map_1$-$Map_n$) that are associated with one or more tables in order to optimize processing of database queries relating to the one or more tables in a database system that stores the one or ore tables in accordance with one embodiment.

DETAILED DESCRIPTION

Figure 1A:
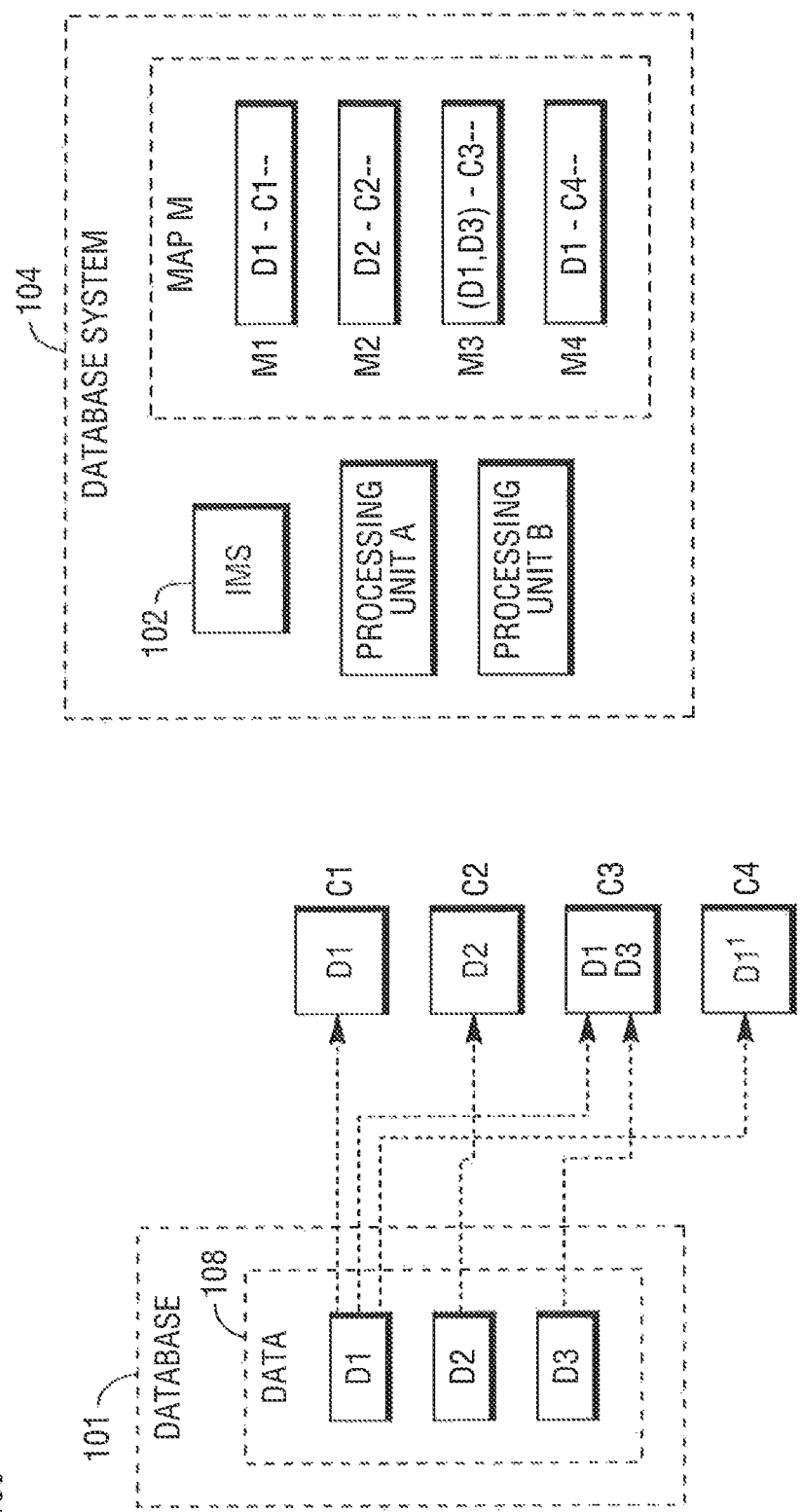
FIG. 1A depicts an Intelligent (or open or robust) Mapping System (IMS) in a database environment in accordance with one embodiment.

As noted in the background section, database systems with multiple processing units are very useful. Generally, database systems with multiple processing units need to assign data to their processing units for processing. Typically, the data being assigned is associated with database queries being processed by the database system. Ideally, data should be assigned to the processing units in an efficient manner to effectively allow them to work together at the same time to extent possible or needed.

Conventionally, data can be assigned to the processing units of a database system by using a hashing technique, as generally known in the art. However, hashing may not be an ideal solution for every situation. Generally, different assignments strategies may be more effective as one strategy may work better than the other in a given situation. For example, an assignment strategy used for larger tables may not be ideal for smaller tables, or vice versa. As such, there is a need for improved techniques for assignment of data for processing by the processing units of database systems with multiple processing units.

It will be appreciated that data can be assigned to processing units of a database system with multiple processing in accordance with one aspect. The assignment of data to the processing units can be referred to herein as mapping data. As such, a data map (or a map) can be used for assigning data to processing units of a database system with multiple processing in accordance with one embodiment. In other words, maps (or other suitable mechanism or effectively assigning data) can be provided as a more effective solution for assigning data to the processing units of database systems that can operate with multiple processing units. Generally, a map can be used to assign data to the processing units for processing, virtually in any desired manner (e.g., virtually any desired function). By way of example, maps can associate data to containers (e.g., buckets) and associate the containers to processing units of database system with multiple processing units in accordance with one embodiment.

In accordance with another aspect, multiple assignments (e.g., multiple maps) can be provided for assignment of the same data. In accordance with yet another aspect, multiple assignment (e.g., multiple maps) can have various states (e.g., active, inactive). It will also be appreciated that the (data assignments) (e.g., maps can be used to provide additional benefits, including, for example, fault resiliency, query optimization, elasticity. Also, it will be appreciated that data assignments (e.g., maps) can better facilitate implementation of desired application and/or environments, including, for example, software only and Cloud, Commodity, and Open Environments, as well as, Open, Purpose-Built, or Multi-Platforms.

Embodiments of these aspects of the invention are also discussed below with reference to FIGS. 1-17. However, those skilled in the art will readily appreciate that the detailed description given herein with respect to these figures is for explanatory purposes as the invention extends beyond these limited embodiments.

FIG. 1A depicts an Intelligent (or open or robust) Mapping System (IMS) 102 in a database environment 100 in accordance with one embodiment. Generally, the IMS 102 can be associated with a database 101 configured to store data 108, for example, in various storage devices, including, volatile (e.g., memory) and non-volatile storage devices (e.g., HDD's, SSD) (not shown). Referring to FIG. 1A, the IMS 102 can, for example, be provided as a part (or a component) of a database system (e.g., a database management system) 104 that may include and/or be operatively connected to a plurality of processing units (A and B). Those skilled in the art will readily know that each one the processing units A and B can, for example, include one or more physical processors (e.g., CPUs). The processing units (or processing modules) A and B, can, for example, be part of two different nodes or the same node of a multi-node database system that includes the database system 104. Also, as those skilled in the art will readily appreciate, the IMS 102 can be provided using hardware and/or software components. For example, IMS 102 can be provided, in part, or entirely, as computer executable code stored in a non-transitory computer readable storage medium (e.g., volatile or non-volatile memory) (not shown). It should be noted that the IMS 102 can also be provided as a separate component that may or may not interact with the database system 104.

In any case, it will be appreciated that IMS 102 can effectively assign (or associate) multiple distinct portions of the data 108 of the database 101 (e.g., D1, D2, D3) to one or more of the multiple processing units A and B of the database system 102 for processing. In doing so, the IMS 102 can effectively use a map (or a mapping scheme) provided as mapping data (or a map) M that associates multiple distinct portions of the data D of the database to multiple distinct data containers (or "containers") C (e.g., C1, C2, C3 and C4). The map M can also associate each one the multiple distinct containers C for processing to one or more of the multiple processing unit A and B of the database system 102. As such, the map M can, for example, be provided as input to the IMS 102. As those skilled in the art will readily appreciate, the IMS 102 may also be configured used to create, store and/or maintain the map M. As such, the map M can be provided as a part of the IMS 102. Generally, the map M can be stored in a non-volatile or volatile storage. Typically, it would be more useful to store Map M in non-volatile storage so that the mapping information can be preserved. The map M can, for example, be provided at least in part by a human (e.g., database administrator). As such, the IMS 102 may also be configured to interface or interact with a user (e.g., a human, a database administrator, an application program) in order to create and/or maintain the map M.

Referring to FIG. 1A, map (or mapping data) M can be represented by multiple individual mappings (or maps) M1, M2, M3 and M4, such that each one of the mappings associates or assigns one or more distinct portions of the data 108 of the database 101 (e.g., D1, D2, D3) to one or more of the multiple processing units A and B of the database system 102. In doings, the distinct portions of the data 108 can be mapped to distinct containers C that can, in turn, be mapped to the processing units A and B for processing.

It will also be appreciated that that unlike conventional techniques, the distinct portions of the data 108 of the database 101 (e.g., D1, D2, D3) need not be assigned or associated to the processing units A and B of the database system 104 for processing, using only a hashing scheme. In other words, the map M can allow virtually any type of assignment and/or association to be made between the data portions and processing units of the database system 104. For example, referring to FIG. 1A, a database table D2, in its entirety, can be mapped as data D2 to at least one container C2. As another example, a round-robin technique can be used to map multiple distinct portions of the data 108 of the database 101 to multiple distinct containers, for example, such that data portion D1 is mapped to the container C1, the data portion D2 is mapped to a container C2, and so on (shown in FIG. 1A). As yet another example, referring again to FIG. 1A, the same portion of data (D1) of the database 101 can be mapped to multiple containers (C1 and C4). In other words, copies or logical copies of the same distinct data portions (e.g., logical copies D1 and $D1^1$ of the same distinct data) can be coexist and can be effectively mapping to different containers using different maps. As an another example, data D1 and D3 can also both be mapped to the container C3, and so on. Although not shown in FIG. 1A, it should be noted that each one of the individual maps (m1, m2, m3 and m4) can also map the containers C1, C2, C3 and C4 to the processing units A and B. Alternatively, one or more of the containers C1, C2, C3 and C4 can be mapped to the processing units A and B using additional mapping information (e.g., a set of map that are separate from maps m1, m2, m3 and m4. In any case, as mapping data, map M can effectively map the data portions to the processing units virtually in any desired manner.

In view of the foregoing, it is apparent that the map M and IMS 102 can provide and use an open, robust and intelligent mapping system for the database 101 where the mapping of data to the processing units A and B of the database system 102 need not be limited to hashing schemes. As will be discussed in greater detail, the map data M and IMS 102 can provide additional significant benefits, including, for example, fault resiliency, elasticity, and optimization of queries. In addition, the map data M and IMS 102 can provide a more suitable environment, for example, for implementations of various desired environments or applications, including, for example, "Cloud," "Commodity", "Open" and "Software Only" platforms or models.

As will also be discussed in greater detail, query optimization can be done by considering maps in the map data M. Also, the maps in the map data M need not be independent on a specific platform and/or hardware. Furthermore, the IMS 102 can perform various map related operations, including, for example, creating new maps, deleting maps, growing a map, shrinking a map, merging maps, separating or dividing a map into multiple maps, activating (or bringing online) a map and deactivating (bringing offline) a map. For example, IMS can facilitate creation of new maps for new data and/or new processing units, as data becomes available for storage in the database 101 and/or as new processing units are added to the database system 102. Similarly, old maps pertaining to data no longer needed or to be deleted from the database 101 and/or old maps pertaining to processing units that are to be removed from the database system 102 can be deleted. As another example, maps can become active or inactive during a reconfiguration process in a dynamic manner allowing the database system 102 to still operate with a set of active maps.

By way of example, one or more of the containers C can be provided as one or more "buckets" (e.g., conventional buckets as generally known in the art) and the processing units (1-N) can be provided by using one or more physical processors or virtual processors, for example, as one or more virtual processors (e.g., an "Access Module Processer" (AMP)) running on one or more physical processors, such as AMPs provided in a Teradata Active Data Warehousing System as will be known to those skilled in the art. As such, a Map M can, for example, effectively associate or assign data D to buckets and also associate or assign AMP's (or AMPS) in accordance with embodiment.

Figure 1B:
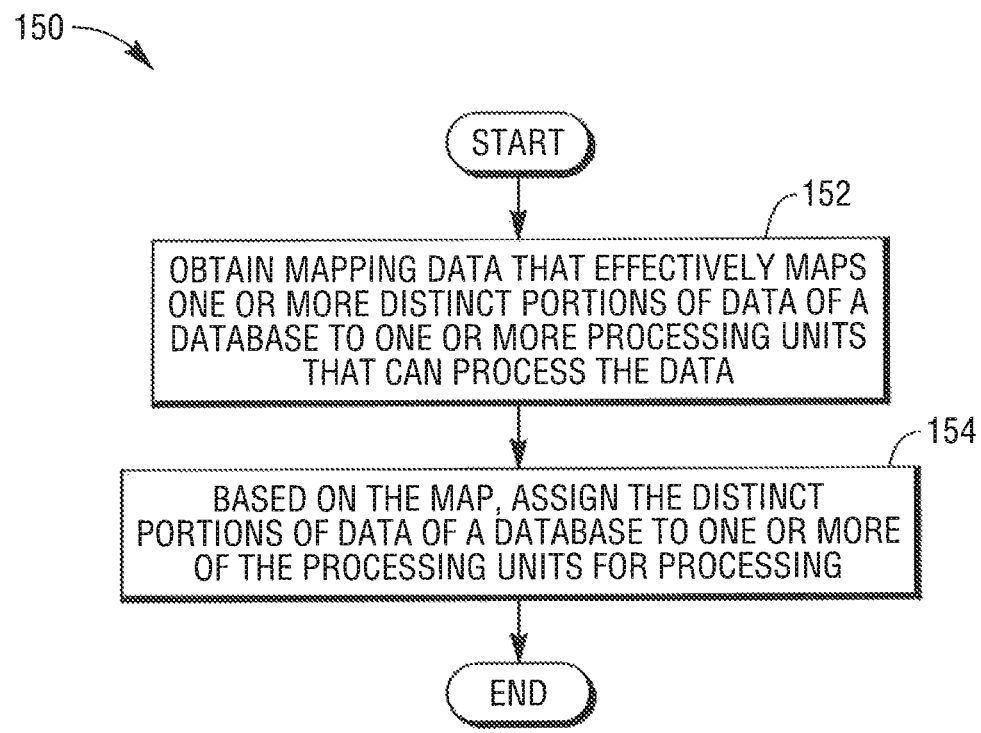
FIG. 1B depicts a method for processing data of a database by a database system that includes multiple processing units (or processing modules) in accordance with one embodiment.

FIG. 1B depicts a method 150 for processing data of a database by a database system that includes multiple processing units (or processing modules) in accordance with one embodiment. It should be noted that each one of the processing units can be configured to process at least a portion of data of the database, by using one or more physical processors. Method 150 can, for example, be performed by the IMS 101 (shown in FIG. 1A) or more generally, a database system configured for multiple processing units. Referring to FIG. 1B, initially, at least one map is obtained (e.g., stored, accessed, determined, generated) 152. The map at least associates multiple distinct portions of data of the database to multiple distinct containers. The map also associates at each one the multiple distinct containers to one or more of the multiple processing units for processing. Next, at least partially based on the map, one or more of the multiple distinct portions of the data is assigned (152) to one or more of the multiple processing units for processing.

Figure 2:
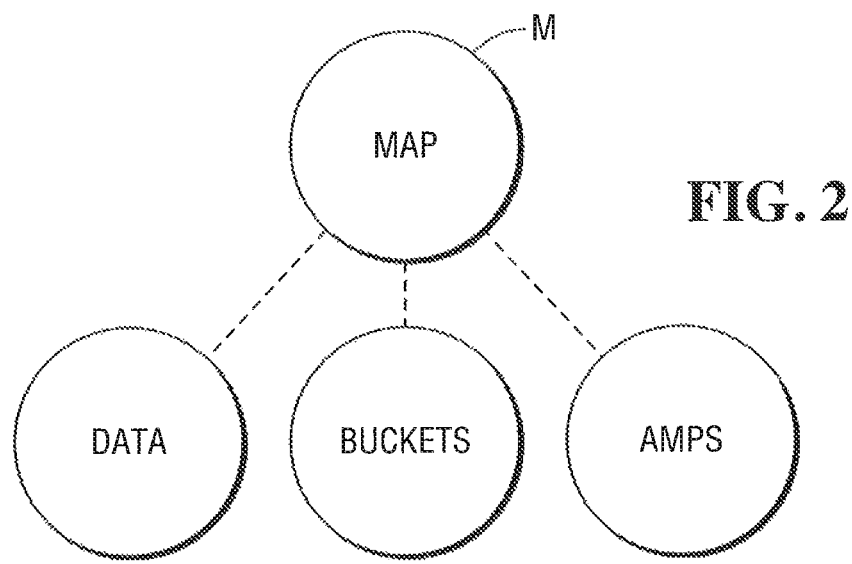
FIG. 2 depicts an exemplary MAP that associates or assigns data to buckets and AMPS in accordance with one embodiment.

To elaborate further, FIG. 2 depicts an exemplary MAP M that associates or assigns data to buckets and AMPS in accordance with one embodiment. Referring to FIG. 2, data can be assigned to buckets using various techniques, including, for example, hashing, adaptive round robin, as well as virtually any other desired function or assignment. For example, a function or assignment can be defined that associates a particular data component or type (e.g., a database table) to a bucket. Similarly, buckets can be assigned using various techniques, including, for example, hashing, adaptive round robin, as well as virtually any other desired function or assignment.

Generally, a map M (shown in FIG. 1A) can effectively assign a particular type of data or data component of databases to a container (e.g., a bucket) in various ways without virtually any limitations. One example of a particular type of data or data component that is currently prevalent in databases is a database table (or "table"). As such, tables will be used as an example to further elaborate on how a map M can be effectively used to assign data for various purposes.

FIG. 3 depicts one or more maps provided for one or more tables in accordance with one embodiment. Referring to FIG. 3, a map can be provided for one or more tables in consideration of various applications, purposes and/or advantages (e.g., optimization of database queries, fault resiliency, elasticity, "software-only" applications). One example is a map-aware optimizer that uses various maps defined for a table, or a set of tables, in order to facilitate optimization of the execution and/or processing of database queries relating to the one or more tables. Another example, would be fault resiliency, where multiple maps can, for example, allow a database query to be processed and/or executed using one or more alternative maps that effectively provide one or more alternative paths for processing and/or execution of the database quires of database system in case a point in the database system fails (e.g., a node in a multi-node database system fails). Yet as another example, a map can be used to provide elasticity, whereby, maps can be used to allow growth and reductions of tables in a dynamic manner without having to shut down a database system. For example, one or more tables can be expanded or reduced by using an alternative map that effectively replaces the old map. Still another example is a "software only" application, where maps, for example, allow assignment of tables in consideration of Cloud, Commodity and Open Platform environments, where no specific hardware or platform limitations (e.g., a Raid, Shared Array) need to be made to define maps.

In other words, a map M (shown in FIG. 1A) can effectively assign a particular type of data or data component of a database to a container (e.g., a bucket) in various ways without virtually any limitations. One example of a particular type of data or data component that is currently prevalent in databases is a database table (or "table"). As such, tables will further be used as an example to further elaborate on how a map M can be effectively used to assign data for various purposes.

FIG. 4 depicts maps that effectively assign data of a database, including tables, to buckets and AMPS for various applications in accordance with one embodiment. In this example, AMPS can be assigned in consideration of Open platforms as well as targeted platforms (e.g., a platform built for a specific purpose, for example, such as, a platform built to provide faster access by using memory instead of disk storage provided by other platforms.

Figure 5:
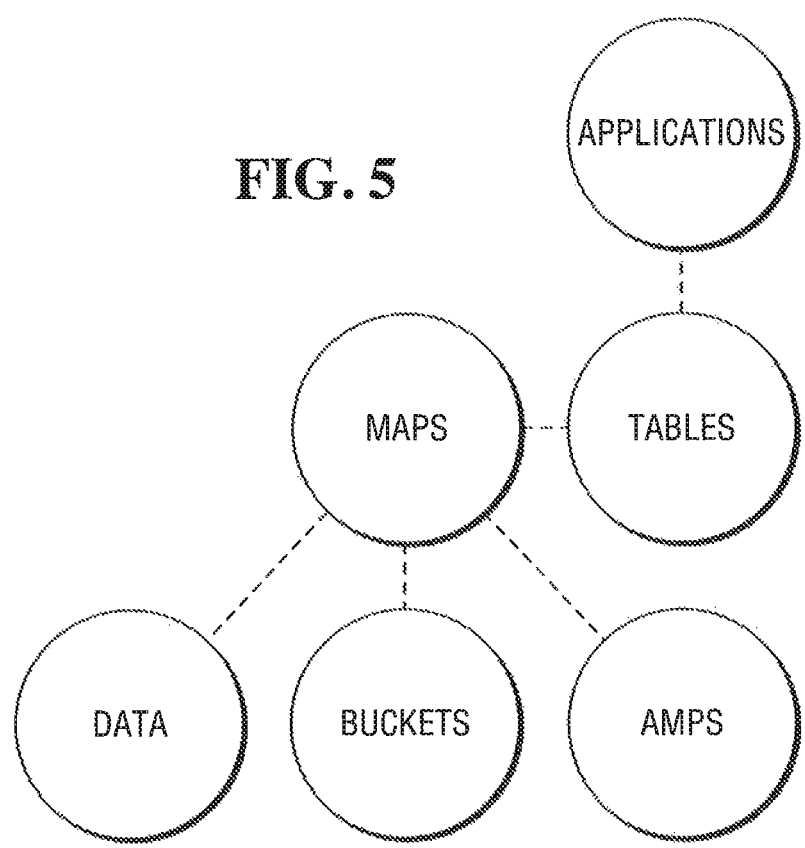
FIG. 5 depicts maps that can effectively assign data of a database, including specific data components (e.g., tables) to containers (e.g., buckets) and processing units (e.g., AMPS) for various applications and in consideration of desired platforms in accordance with one embodiment.

More generally, FIG. 5 depicts maps that can effectively assign data of a database, including specific data components (e.g., tables) to containers (e.g., buckets) and processing units (e.g., AMPS) for various applications (e.g., optimizations, fault resiliency, elasticity, "software only" applications) and in consideration of desired platforms (e.g., Open Platforms, purpose-built platforms) in accordance with one embodiment.

Figure 6:
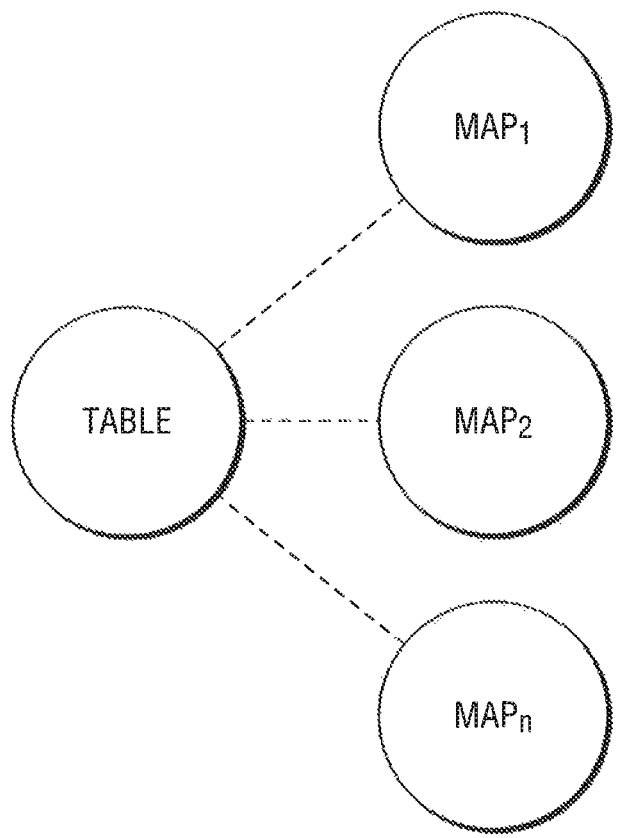
FIG. 6 depicts a table that can be effectively assigned to multiple maps for various purposes and/or applications in accordance with one embodiment.

To elaborate even further, FIG. 6 depicts a table that can be effectively assigned to multiple maps for various purposes and/or applications in accordance with one embodiment. By way of example, those skilled in the art will appreciate that a table can be stored in multiple maps for data protection allowing, for example, RAID alterative or augmentation applications, fault domains, and permuted maps, etc.

Figure 7:
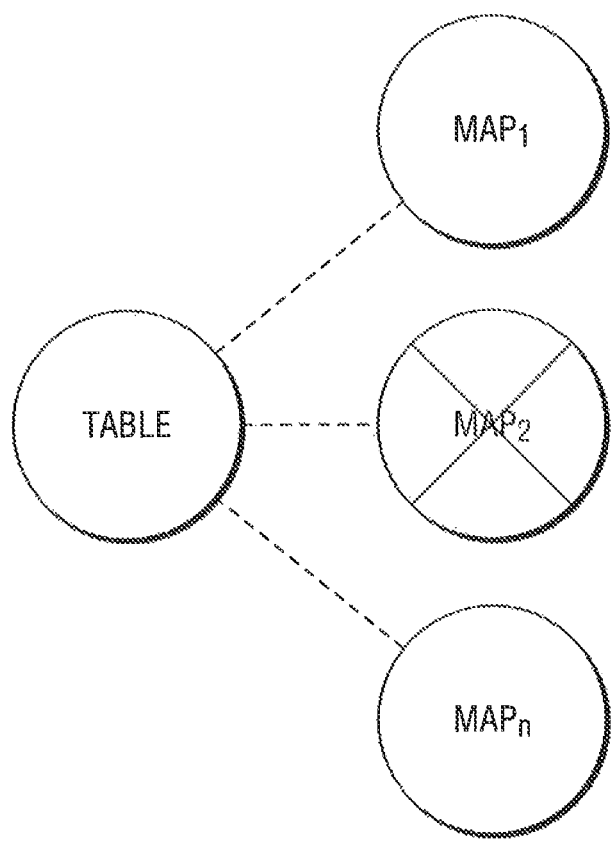
FIG. 7 depicts maps that can have various states (e.g., active, inactive, on-line, offline) where the maps can be associated with a single table or a set of tables in accordance with one embodiment.

FIG. 7 depicts maps that can have various states (e.g., active, inactive, on-line, offline) where the maps can be associated with a single table or a set of tables in accordance with one embodiment. By way of example, at a given time, a number of maps can be on-line or active while a number of other maps can be inactive or offline. In the example, the maps that are on-line or active can be made to be consistent with each other as it will be appreciated by those skilled in the art. It should also be noted that at a given time, a part of a map may be active or online while another part of the map can be inactive or offline.

In addition to various states that can be assigned to map and synchronization that can be made to ensure consistency, various other operations can be performed on maps. For example, the maps can associated with one or more tables of a database.

Figure 8:
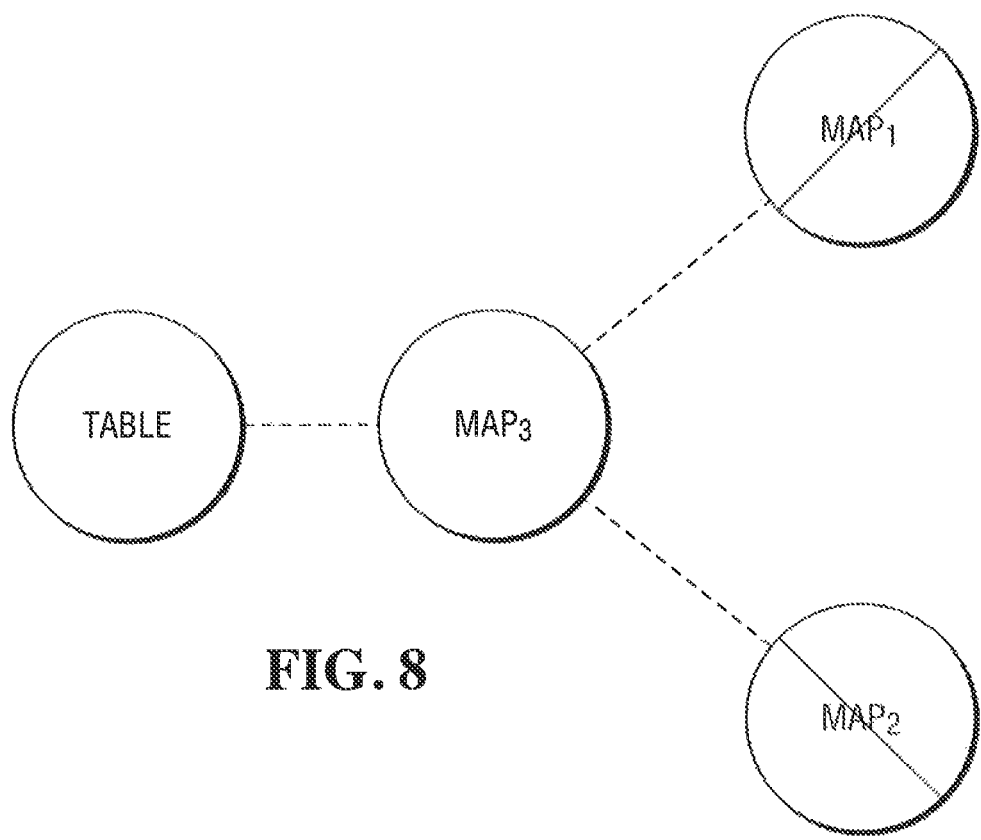
FIG. 8 depicts merger of two maps (Map 1 and Map 2) that are partially offline to form a map (Map 3) that can then be brought in its entirety or completely online in accordance with one embodiment.

To further elaborate, FIG. 8 depicts merger of two maps (Map 1 and Map 2) that are partially offline to form a map (Map 3) that can then be brought in its entirety or completely online in accordance with one embodiment. By way of example, permuted maps can be merged to provide node failure resiliency in a multi-node database system. As such, maps can be formed in a dynamic manner without having to fully shutdown a database system in order to reconfigure it.

It should also be noted that containers (e.g., buckets) and processing units (e.g., AMPs) can also have different states, including, for example, active, inactive, on-line and offline. FIG. 9 depicts processing units (e.g., parallel processing units) that can be online or offline at a given time in accordance with one embodiment.

FIG. 10 depicts disjoint maps associated with different pools of processing units (e.g., Parallel AMP units in a multi-node database system) in accordance with one embodiment.

FIG. 11 depicts storage of tables in disjoint maps in accordance with one embodiment. Referring to FIG. 11, a relatively larger (or big) table is stored in a first map (map 1) and a relatively smaller (or small) table is stored in another map that is a disjoint map from the first map, namely, a second map (map 2). It will be appreciated that the configuration depicted in FIG. 11 can be used for a number of application provide a number of advantages, including, for example, more efficient access to data stored in tables of a database, and hardware acceleration.

In view of the foregoing, it will be appreciated that maps can be provided in an intelligent manner (map intelligence). Maps provided in accordance with one or aspects, among other things, can allow parallel database systems to change dynamically and transparently. In addition, maps can be provided in a highly intelligent manner with an optimizer that can effectively use the maps to improve the processing of database queries in a database system.

To elaborate still further, FIG. 12 depicts a map-aware optimizer configured to use multiple maps ($Map_1$-$Map_n$) that are associated with one or more tables in order to optimize processing of database queries relating to the one or more tables in a database system that stores the one or more tables in accordance with one embodiment. It should be noted that multiple maps ($Map_1$-$Map_n$) can be associated with a single table of a database.

Figure 13:
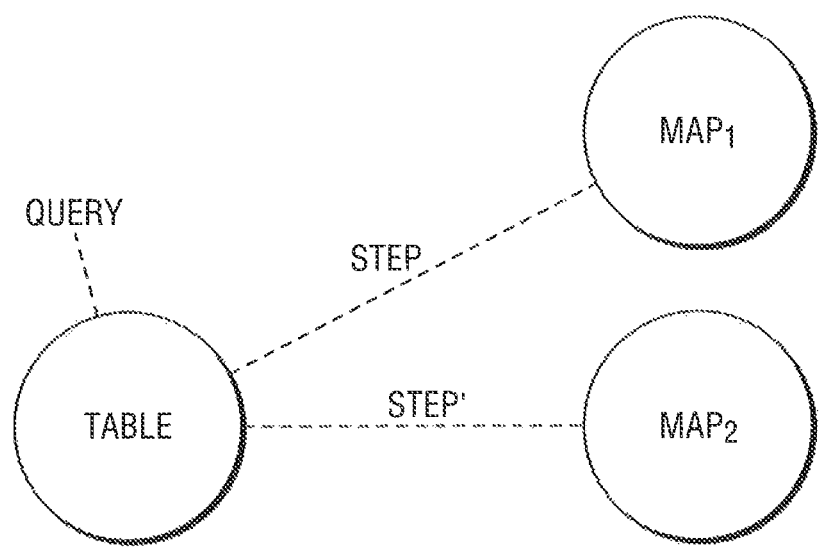
FIG. 13 depicts processing of database queries associated with one or more tables in tandem (tandem queries) in accordance with one embodiment.

As another example, FIG. 13 depicts processing of database queries associated with one or more tables in tandem (tandem queries) in accordance with one embodiment. Referring to FIG. 13, "active redundancy" can be achieved by processing virtually all query steps redundantly on multiple maps ($Map_1$ and $Map_2$) as multiple processes, whereby the first process to complete can allow the query to advance. In this example, spools from streams that do not complete within a determined amount of time can be abandoned. Also, "reactive redundancy" can be achieved by attempting to execute each step of a database query in one map (e.g., $Map_1$) provided for one or more tables. However, in case of a failure of one or more steps of the database query, the one or more steps can be executed using another map (e.g., $Map_2$) that is also provided for the one or more tables. It should be noted that redundancy provided by multiple maps can eliminate the need to restart the database query when there is failure. By way of example, when a node in a multi-node database system fails, an alternative node provided by an alternative map can be used.

Figure 14:
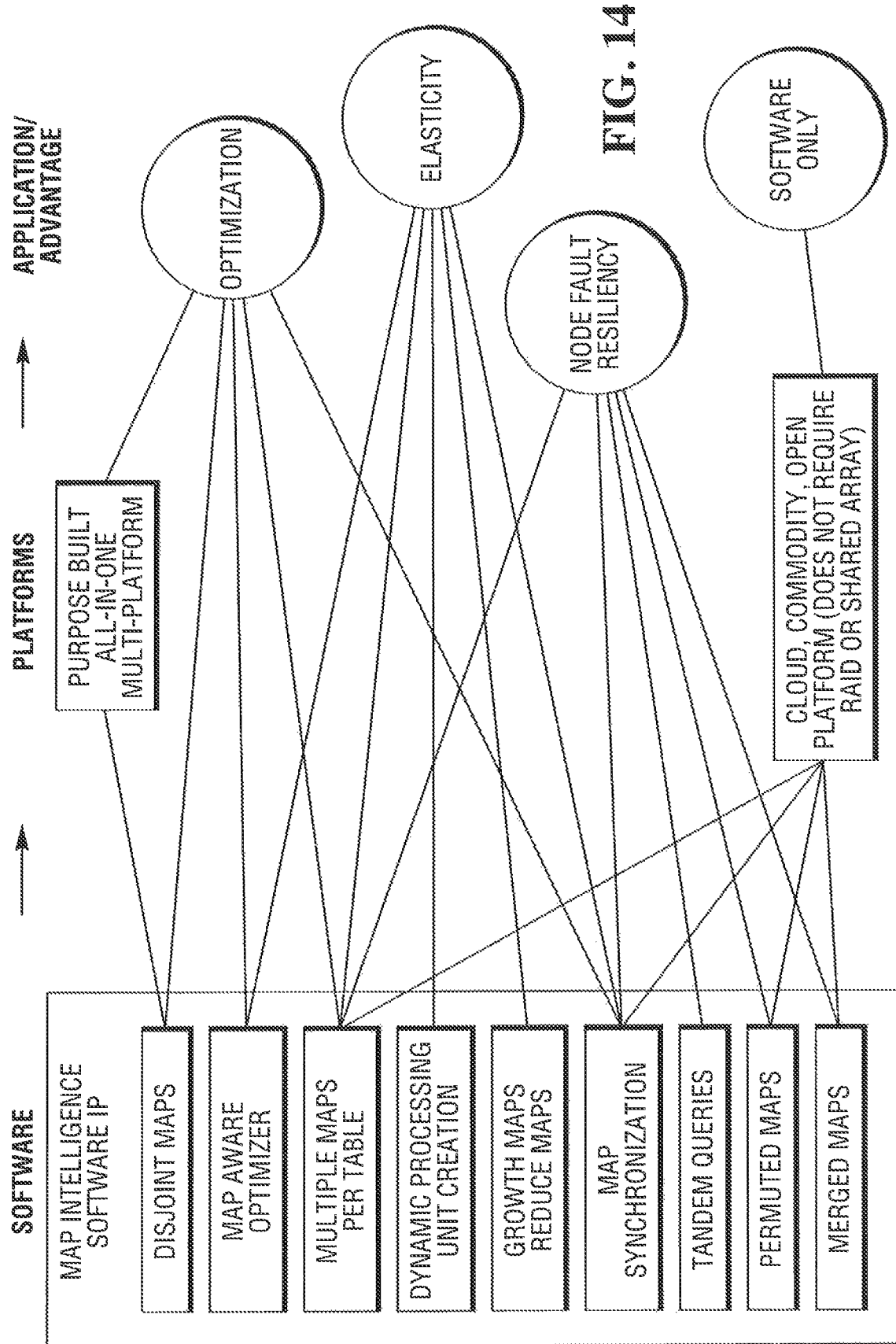
FIG. 14 depicts exemplary features associated with maps that can be provided in accordance with one or more embodiments.

FIG. 14 depicts exemplary features associated with maps that can be provided in accordance with one or more embodiments. FIG. 14 can also provide a summary of some of the features associated with map that are noted above. Referring to FIG. 14, as one exemplary feature, disjointed maps can be used for purpose built platforms, all-in-one platforms and multi-platforms. Disjointed maps can allow better database query optimization. Optimization can also be achieved by using map-aware optimizers and map synchronization. Elasticity can be achieved by using one or more exemplary features, namely, map-aware optimizers, dynamic processing unit (e.g., AMP) creation, map synchronization, and so on.

It should be noted that numerous operations associated with maps can be performed in databases. For example, a new map can be created. A map can be deleted. Maps can be merged. Maps can grow and shrink reduced in size. Maps can be activated or deactivated. Data in one map can be synchronized by data in another map. Data can be mapped to containers (e.g., buckets) using virtually any desired assignment. Similarly, containers can be assigned to processing units (e.g., AMPS) using virtually any desired assignment. Similarly, maps allow creation of new processing units (e.g., AMPS) in a database system. A processing unit can be assigned an identifier (e.g., an Amp number). A map can be created that includes a new processing unit *(e.g., a new AMP). A map that includes a particular processing unit can be deleted or deactivated. Generally, a processing unit may appear in no maps, multiple maps, many maps, or even all the maps. A processing unit that appears in no maps may, for example, be associated with a processing unit that is being configured or one that has been effectively removed from a database system. Each map can, for example, refer to a set of processing units, wherein the sets may overlap partially or fully, or be disjointed. Also, a container may exist in one more maps, may be associated with one or more processing units.

Figure 15:
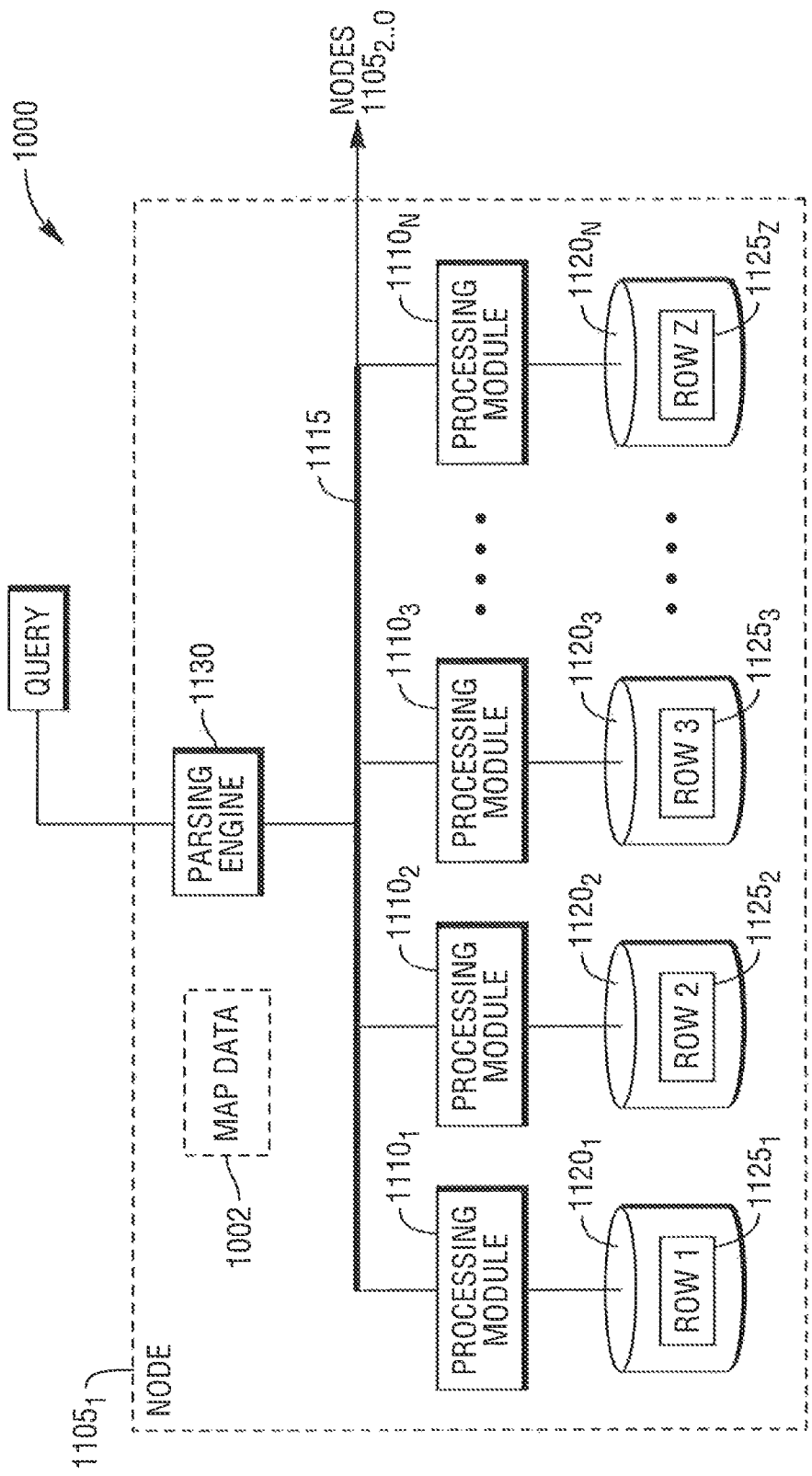
FIG. 15 depicts an exemplary architecture for one database node 11051 of the DBMS 100 in accordance with one embodiment.

FIG. 15 depicts an exemplary architecture for one database node 11051 of the DBMS 100 in accordance with one embodiment. The DBMS node 11051 includes one or more processing modules 1110-N connected by a network 1115, that manage the storage and retrieval of data in data-storage facilities 11201-N. Each of the processing modules 1110-N represents one or more physical processors or virtual processors, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are four (4) virtual processors and four (4) physical processors, then typically each virtual processor would run on its own physical processor. If there are eight (8) virtual processors and four (4) physical processors, the operating system would schedule the eight (8) virtual processors against the four (4) physical processors, in which case swapping of the virtual processors would occur. Each of the processing modules 11101-N manages a portion of a database stored in a corresponding one of the data-storage facilities 1201-N. Each of the data-storage facilities 11201-N can includes one or more storage devices (e.g., disk drives). The DBMS 1000 may include additional database nodes 11052-O in addition to the node 11051. The additional database nodes 11052-O are connected by extending the network 1115. Data can be stored in one or more tables in the data-storage facilities 11201-N. The rows 11251-z of the tables can be stored across multiple data-storage facilities 11201-N to ensure that workload is distributed evenly across the processing modules 11101-N. A parsing engine 1130 organizes the storage of data and the distribution of table rows 11251-z among the processing modules 11101-N. The parsing engine 1130 also coordinates the retrieval of data from the data-storage facilities 11201-N in response to queries received, for example, from a user. The DBMS 1000 usually receives queries and commands to build tables in a standard format, such as SQL. In one embodiment, the rows 11251-z are distributed across the data-storage facilities 11201-N associated with processing modules 11101-N, by the parsing engine 1130 in accordance with mapping data or map (1002).

Figure 16:
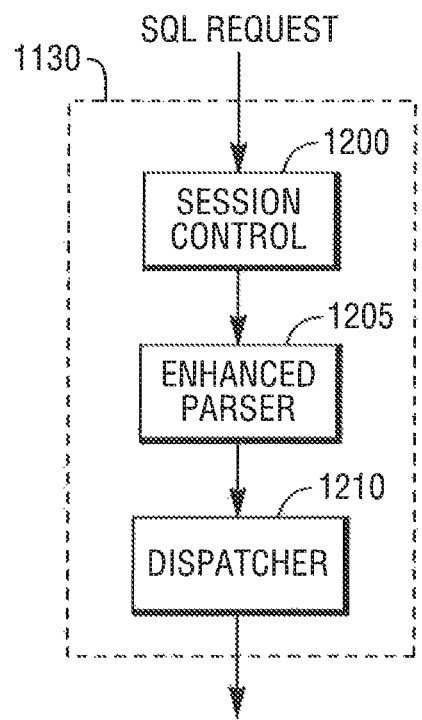
FIGS. 16 and 17 depict a parser in accordance with one embodiment.

In one exemplary system, the parsing engine 1130 is made up of three components: a session control 1200, a parser 1205, and a dispatcher 1210, as shown in FIG. 16. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for capacity and workload management may be performed by a regulator (e.g., regulator 415). The Regulator can monitor capacity and workloads internally. It can, for example, do this by using internal messages sent from the AMPs to the dispatcher 1210. The dispatcher 1210 provides an internal status of every session and request running on the system. It does this by using internal messages sent from the AMPs to the dispatcher 1210. The dispatcher 1210 provides an internal status of every session and request running on the system.

Figure 17:
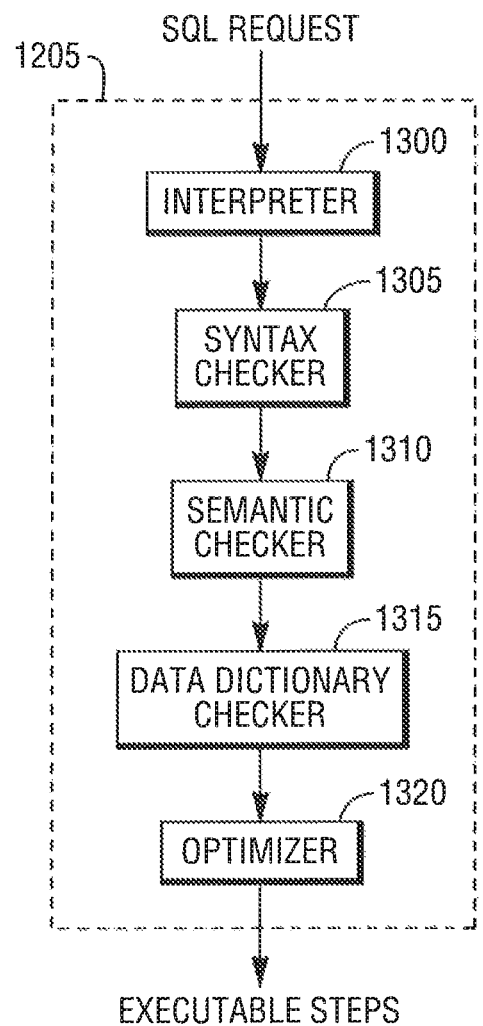

As depicted in FIG. 17, the parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an optimizer (block 1320), which generates the least expensive plan to perform the request.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of processing data of a database by a database system, wherein the database system includes one or more processors effectively providing multiple processing units each configured to process at least a portion of the data of the database, and wherein the computer-implemented method comprises:

obtaining, by the one or more processors of the database system, at least one map that at least: (a) associates multiple distinct portions of data of the database to multiple distinct containers, and (b) also associates each one the multiple distinct containers to one or more of the multiple processing units for processing the data of the database that is associated with its respective associated distinct container, wherein each one of the multiple distinct containers is associated with at least one of the multiple distinct portions of data of the database, thereby the containers effectively containing multiple distinct portions of data of the database, wherein each one of the multiple distinct portions of data of the database includes at least a part of one or more database tables of the database, and wherein the associating of multiple distinct portions of the data of the database to multiple distinct containers by the obtained map further comprises: mapping the entire content of at least one database table of the database to at least one of the multiple distinct containers;

assigning, by the one or more processors of the database system, at least partially based on the obtained at least one map, one or more of the multiple distinct portions of data of the database, assigned by the at least one map, to one or more of the multiple processing units for processing of the multiple distinct portions of data of the database by the one or more of the assigned multiple processing units as assigned by the at least one obtained map, wherein the assigning by the database system uses only the at least one map to assign one or more of the multiple distinct portions data of the database to the one or more of the multiple processing units for processing by the multiple processing units in parallel, and wherein the same distinct portion of data of the database is mapped to multiple distinct containers by multiple maps at the same time, wherein the at least one map includes at least one status, and wherein the at least one status includes two states: an active state, and an inactive state;

receiving, by the database system, a database query of the data of database including the one or more of the multiple distinct data portions assigned by the at least one map; and thereafter, processing, by the one or more of the multiple processing units of the database system, at least partially based on the at least one obtained map, the one or more respectively assigned multiple distinct portions of data of the database, in response to the database query.

2. The method of claim 1, wherein the at least one map does not hash the multiple distinct portions of data of the database to the multiple distinct containers that are associated with multiple processing units for processing units.

3. The method of claim 1, wherein the method further comprises: using the multiple maps by an optimizer to optimize one or more database queries.

4. The method of claim 3, wherein the method further comprises:
using one of the multiple maps to process a first part of a database query, and
using another one of the multiple maps to process a second part of the database query, different than the first part of the database queries.

5. The method of claim 1, wherein the multiple maps effectively use two different alternative paths of nodes in the database system, and wherein the method further comprises:
using a first one of alternative paths to process a database query;
using a second one of the alternative paths when it is determined not to use the first one of the alternative paths.

6. The method of claim 5, wherein the determining not to use the first one of the alternative paths further comprises: determining that one or more nodes of the nodes in the first one of the alternative paths have failed.

7. The method of claim 6, wherein the at least one map maps multiple copies of the same data portion to different containers.

8. The method of claim 1, wherein the at least one map is independent of one or more specific platforms.

9. A non-transitory computer readable storage medium storing at least executable code that when executed:
obtains at least one map that at least: (a) associates multiple distinct portions of data of the database to multiple distinct containers, and (b) also associates each one the multiple distinct containers to one or more of multiple processing units of a database system for processing the data of the database that is associated with its respective associated distinct container, wherein each one of the multiple distinct containers is associated with at least one of the multiple distinct portions of data of the database, thereby the containers effectively containing multiple distinct portions of data of the database, wherein each one of the multiple distinct portions of data of the database includes at least a part of one or more database tables of the database, and wherein the associating of multiple distinct portions of the data of the database to multiple distinct containers by the obtained map further comprises:
mapping the entire content of at least one database table of the database to at least one of the multiple distinct containers;
assigns, by the one or more processors of the database system, at least partially based on the obtained at least one map, one or more of the multiple distinct portions of data of the database, assigned by the at least one map, to one or more of the multiple processing units for processing of the multiple distinct portions of data of the database by the one or more of the assigned multiple processing units as assigned by the at least one obtained map, wherein the assigning by the database system uses only the at least one map to assign one or more of the multiple distinct portions data of the database to the one or more of the multiple processing units for processing by the multiple processing units in parallel, and wherein the same distinct portion of data of the database is mapped to multiple distinct containers by multiple maps at the same time, wherein the at least one map includes at least one status, and wherein the at least one status includes two states: an active state, and an inactive state;
receives, by the database system, a database query of the data of database including the one or more of the multiple distinct data portions assigned by the at least one map; and
thereafter, processes, by the one or more of the multiple processing units of the database system, at least partially based on the at least one obtained map, the one or more respectively assigned multiple distinct portions of data of the database, in response to the database query.

10. The non-transitory computer readable storage medium as recited in claim 9, wherein the at least one map does not hash the multiple distinct portions of data of the database to the multiple distinct containers that are associated with multiple processing units for processing units.

11. The non-transitory computer readable storage medium as recited in claim 9, wherein the executable code when executed further:
uses the multiple maps by an optimizer to optimize one or more database queries.

12. The non-transitory computer readable storage medium as recited in claim 11, wherein the executable code when executed further:
uses one of the multiple maps to process a first part of a database query, and using another one of the multiple maps to process a second part of the database query, different than the first part of the database queries.

13. The non-transitory computer readable storage medium as recited in claim 9,
wherein the multiple maps effectively use two different alternative paths of nodes in the database system, and wherein the executable code when executed further:
uses a first one of alternative paths to process a database query; and
uses a second one of the alternative paths when it is determined not to use the first one of the alternative paths.

14. The non-transitory computer readable storage medium as recited in claim 13, wherein the determining not to use the first one of the alternative paths further comprises: determining that one or more nodes of the nodes in the first one of the alternative paths have failed.

15. The non-transitory computer readable storage medium as recited in claim 9, wherein the at least one map maps multiple copies of the same data portion to different containers.

16. The non-transitory computer readable storage medium as recited in claim 9, wherein the at least one map is independent of one or more specific platforms.

17. A database system, comprising: one or more processors that effectively provide multiple processing units each configured to process at least a portion of the data of the database, wherein the one or more processors are configured to:
obtain at least one map that at least: (a) associates multiple distinct portions of data of the database to multiple distinct containers, and (b) also associates each one the multiple distinct containers to one or more of multiple processing units of a database system for processing the data of the database that is associated with its respective associated distinct container, wherein each one of the multiple distinct containers is associated with at least one of the multiple distinct portions of data of the database, thereby the containers effectively containing multiple distinct portions of data of the database, wherein each one of the multiple distinct portions of data of the database includes at least a part of one or more database tables of the database, and wherein the associating of multiple distinct portions of the data of the database to multiple distinct containers by the obtained map further comprises: mapping the entire content of at least one database table of the database to at least one of the multiple distinct containers;
assign, by the one or more processors of the database system, at least partially based on the obtained at least one map, one or more of the multiple distinct portions of data of the database, assigned by the at least one map, to one or more of the multiple processing units for processing of the multiple distinct portions of data of the database by the one or more of the assigned multiple processing units as assigned by the at least one obtained map, wherein the assigning by the database system uses only the at least one map to assign one or more of the multiple distinct portions data of the database to the one or more of the multiple processing units for processing by the multiple processing units in parallel, and wherein the same distinct portion of data of the database is mapped to multiple distinct containers by multiple maps at the same time, wherein the at least one map includes at least one status, and wherein the at least one status includes two states: an active state, and an inactive state;
receive, by the database system, a database query of the data of database including the one or more of the multiple distinct data portions assigned by the at least one map; and
thereafter, process, by the one or more of the multiple processing units of the database system, at least partially based on the at least one obtained map, the one or more respectively assigned multiple distinct portions of data of the database, in response to the database query.

18. The database system of claim 17, wherein the at least one map does not hash the multiple distinct portions of data of the database to the multiple distinct containers that are associated with multiple processing units for processing units.

19. The database system of claim 18, wherein the one or more processors are further configured to:
use the multiple maps by an optimizer to optimize one or more database queries.

20. The database system of claim 19, wherein the one or more processors are further configured to:
use one of the multiple maps to process a first part of a database query, and
use another one of the multiple maps to process a second part of the database query, different than the first part of the database queries.

21. The database system of claim 18, wherein the multiple maps effectively use two different alternative paths of nodes in the database system, and wherein the one or more processors are further configured to:
use a first one of alternative paths to process a database query;
use a second one of the alternative paths when it is determined not to use the first one of the alternative paths.

22. The database system of claim 18, wherein the determining not to use the first one of the alternative paths further comprises: determining that one or more nodes of the nodes in the first one of the alternative paths have failed.

23. The database system of claim 22, wherein the at least one map maps multiple copies of the same data portion to different containers.

24. The database system of claim 18, wherein the at least one map is independent of one or more specific platforms.

* * * * *